US008340523B2

(12) United States Patent
Shen et al.

(10) Patent No.: US 8,340,523 B2
(45) Date of Patent: Dec. 25, 2012

(54) TUNABLE OPTICAL FILTER

(75) Inventors: Jinxi Shen, San Ramon, CA (US); Jyoti K. Bhardwaj, Cupertino, CA (US); Barthelemy Fondeur, San Jose, CA (US); Douglas E. Crafts, Los Gatos, CA (US); Robert J. Brainard, Sunnyvale, CA (US); Boping Xie, Hayward, CA (US); David J. Chapman, San Jose, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 871 days.

(21) Appl. No.: 12/390,056

(22) Filed: Feb. 20, 2009

(65) Prior Publication Data

US 2009/0263142 A1 Oct. 22, 2009

Related U.S. Application Data

(60) Provisional application No. 61/029,987, filed on Feb. 20, 2008.

(51) Int. Cl.
*H04J 14/02* (2006.01)

(52) U.S. Cl. .......... 398/85

(58) Field of Classification Search .......... 398/81, 398/85

See application file for complete search history.

(56) References Cited

U.S. PATENT DOCUMENTS 5,596,661 A 1/1997 Henry et al. .......... 385/24
6,208,780 B1 3/2001 Li et al. .......... 385/27
6,704,487 B2 * 3/2004 Parhami et al. .......... 385/129
6,795,654 B2 * 9/2004 Cormack .......... 398/85
6,961,492 B2 * 11/2005 Doerr .......... 385/39
6,978,064 B2 * 12/2005 Yoshida et al. .......... 385/27
7,660,491 B2 * 2/2010 Thaniyavarn .......... 385/3
7,756,416 B2 * 7/2010 Tomofuji et al. .......... 398/2
2004/0239869 A1 * 12/2004 Cavanaugh et al. .......... 349/198
2008/0124076 A1 * 5/2008 Rudolph et al. .......... 398/26
2009/0110401 A1 * 4/2009 Sakharov .......... 398/79

FOREIGN PATENT DOCUMENTS

EP 1492260 12/2004
WO WO 2007/064241 A1 * 6/2007

OTHER PUBLICATIONS

ITU-T G.692, "Optical Interfaces for Multichannel Systems with Optical Amplifiers", Oct. 1998, pp. 6-7, 20.*

* cited by examiner

*Primary Examiner* — Shi K Li

(74) *Attorney, Agent, or Firm* — Matthew A. Pequignot; Pequignot + Myers LLC

(57) ABSTRACT

A tunable PLC optical filter having sequentially connected thermally tunable Mach-Zehnder (MZ) interferometers is described. The MZ interferometers, having free spectral ranges matching ITU frequency grid spacing, are tuned so as to have a common passband centered on the frequency of the signal being selected, while having at least one of the stop-bands centered on any other ITU frequency. Any other optical channel that may be present at any other ITU frequency is suppressed as a result. The PLC chip, including a zero-dispersion lattice-filter interleaver stage, a switchable fine-resolution stage and, or a retroreflector for double passing the filter, is packaged into a hot-pluggable XFP transceiver package. A compensation heater is used to keep constant the amount of heat applied to the PLC chip inside the XFP package, so as to lessen temperature variations upon tuning of the PLC optical filter.

11 Claims, 25 Drawing Sheets

TUNABLE OPTICAL FILTER

CROSS-REFERENCE TO RELATED APPLICATIONS

The present invention claims priority from U.S. Patent Application No. 61/029,987 filed Feb. 20, 2008, which is incorporated herein by reference for all purposes.

TECHNICAL FIELD

The present invention relates to a tunable optical filter, and in particular to a tunable optical filter having cascaded Mach-Zehnder interferometers.

BACKGROUND OF THE INVENTION

Optical filters are devices for selecting at least one optical frequency band, called a passband, out of an optical frequency spectrum of an optical signal. A central frequency of the passband of a tunable optical filter is adjustable, depending upon a control parameter common to a particular filter type. For example, for a bulk optic tunable filter, the control parameter can be a filter tilt or a clocking (rotation) angle with respect to an incoming optical beam. For an optical waveguide based tunable filter such as tunable Mach-Zehnder (MZ) interferometer, the control parameter can be an electrical signal applied to a localized heater that changes optical path length of one of its arms, which effectively tunes the MZ interferometer.

Tuning range, spectral selectivity, and a level of cross-talk suppression are very important parameters of tunable optical filters. A wide tuning range allows a wide range of optical frequencies to be accessed and selected by a tunable filter. The spectral selectivity relates to an ability of the filter to select a narrow frequency band of a broadband optical signal. Herein, the term "narrow" means small as compared to a value of the central frequency of the optical signal being filtered, for example 1% of the central frequency or less. Finally, the crosstalk suppression is an ability of the filter to suppress optical signals at any other frequency than the frequency of the signal being selected.

In an optical communications network optical signals, having a plurality of optical channels at individual optical frequencies or wavelengths called optical frequency channels or wavelength channels, are transmitted from one location to another, typically through a length of an optical fiber. Optical frequency channels can be combined for transmission through a single optical fiber, whereby the transmission capacity of the optical fiber increases many times. Since the optical frequency channels can be amplified simultaneously in a single optical amplifier, the transmission distances are increased, while the associated transmission costs are considerably reduced.

Tunable optical filters are used in optical communications networks for selecting at least one optical frequency channel out of a plurality of channels comprising an optical communications signal. Tunable optical filters are also used for system performance monitoring purposes, e.g. for performing a spectral measurement of the entire optical communications signal, including measuring optical noise levels between the neighboring frequency channels. The tunability of the filter allows any optical frequency component within the tuning range of the filter to be selected for subsequent detection and/or signal level measurement. It is very important that such a tunable filter have an excellent crosstalk suppression. A poor crosstalk suppression leads to undesired "leaking" of the optical channels being suppressed, which impairs the signal level measurements and/or detection and decoding of the selected signal.

U.S. Pat. No. 5,596,661 entitled "Monolithic Optical Waveguide Filters based on Fourier Expansion", issued to Henry et al. of Lucent Technologies and incorporated herein by reference, teaches a planar lightwave circuit (PLC) optical filter having a chain of optical couplers linked by different delays with a transfer function equal to the sum of the contribution from each optical path, with each contribution forming a term in a Fourier series whose sum forms the optical output. Detrimentally, the optical filter of Henry et al. is not tunable.

U.S. Pat. No. 6,208,780 entitled "System and Method for Optical Monitoring", issued to Li et al. of Lucent Technologies and incorporated herein by reference, teaches a tunable optical filter on a PLC chip using cascaded unbalanced MZ interferometers. In the tunable filter of Li et al., successive MZ stages have twice the free spectral range (FSR) as the previous MZ stages, thereby providing a narrowband optical filter having a wide tuning range.

With reference to FIG. 1, a prior-art tunable filter 10 of Li et al. is shown, having cascaded Mach-Zehnder (MZ) interferometers MZ1, MZ2, . . . , MZN connected in series. An optical signal 12 is applied to the first interferometer MZ1, the signal 12 exiting the filter 10 at an output waveguide of the last interferometer MZN. Each of the interferometers MZ1 . . . MZN has two branches, a non-adjustable branch 14 and an adjustable branch 16. Detrimentally, the tunable optical filter 10 requires many MZ stages, including stages that have to be repeated, to achieve a satisfactory crosstalk suppression.

European patent EP1492260A1 entitled "Optical ADD-DROP Multiplexer for WDM Systems", issued to Crognale et al. and incorporated herein by reference, teaches a device that allows, by using selection and blocking functions of optical filtering and optical interleaving, to extract a single optical frequency channel from an optical communications signal and to insert another optical frequency channel at the same optical frequency instead of the one extracted. The device of Crognale et al. uses selective tunable filters to add or drop optical frequency channels. Detrimentally, it also requires many components such as blocking tunable filters, 1×N splitters, switches, and interleavers, which complicates the device and increases its size and cost.

An object of the present invention is to overcome the shortcomings of the prior art by providing a tunable optical filter on a single PLC chip, which combines narrowband spectral performance with wide tuning range and a high level of crosstalk suppression. Advantageously, a tunable optical filter of the present invention has no moving parts while having a switchable spectral resolution for operation at various optical frequency channel spacings. Further, advantageously, a tunable optical filter of the present invention is small enough to be placed within a single standard hot-pluggable XFP package.

SUMMARY OF THE INVENTION

Accordingly, the present invention relates to a tunable optical filter for selecting any single optical frequency channel from a plurality of equidistantly spaced optical frequency channels of an optical signal, each said optical frequency channel having a central frequency, the filter comprising:

a plurality of sequentially coupled tunable Mach-Zehnder (MZ) interferometers, each having a plurality of equidistantly spaced conterminous frequency passbands and frequency stopbands, wherein the MZ interferometers are tunable so as to have one passband of each MZ interferometer centered on the central frequency of the single frequency channel being selected, and to have at least one of the stopbands of the MZ interferometers centered on the central frequency of each remaining optical frequency channel of the optical signal, so as to suppress each said remaining optical frequency channel of the optical signal.

According to one aspect of the present invention, the tunable MZ interferometers of the tunable filter are comprised of planar waveguides of a planar lightwave circuit (PLC) chip that is small enough to be placed within said hot-pluggable XFP transceiver package. The size reduction of the PLC chip is achieved by using a length of an optical fiber that is placed to loop back from one side of the PLC chip to another side, thereby removing a necessity to accommodate waveguide turns on the PLC chip. Alternatively, according to another aspect of the present invention, the size of the PLC chip is reduced by using a mirror attached to an edge of the chip, either for double passing through at least a portion of the PLC chip, or for reflecting at an angle from one end waveguide of the PLC chip to another end waveguide, wherein the two end waveguides form a V-shape, with a mirror being disposed at the tip of the V-shape, so as to optically couple the two said end waveguides together.

According to another aspect of the present invention, the tunable optical filter has a plurality of local heaters disposed on the top surface of the PLC chip, for thermally tuning said tunable MZ interferometers;

a compensation heater for heating said PLC chip; and a control circuitry for thermally tuning said tunable MZ interferometers by controlling an amount of heat generated by the plurality of local heaters and by the compensation heater, so as to keep the total amount of heat generated by all said heaters equal to a constant value, within any control time interval of a sequence of control time intervals.

In accordance with another aspect of the present invention, there is further provided a method of selecting a single optical frequency channel of a plurality of optical frequency channels of an optical signal, each said optical frequency channel having a central frequency, the method comprising:

(a) providing a chain of sequentially connected tunable MZ interferometers each having a plurality of equidistantly spaced conterminous frequency passbands and frequency stopbands, said chain having an input end and an output end;

(b) applying the optical signal to the input end of the chain; and (c) centering one passband of each tunable MZ interferometer on the central frequency of the single optical frequency channel of the optical signal, so as to have at least one of the stopbands of the tunable MZ interferometers centered on the central frequency of each remaining optical frequency channel of the optical signal, so as to suppress each said remaining optical frequency channel of the optical signal.

BRIEF DESCRIPTION OF THE DRAWINGS

The invention will be described in greater detail with reference to the accompanying drawings, in which.

DETAILED DESCRIPTION OF PREFERRED EMBODIMENTS

While the present teachings are described in conjunction with various embodiments and examples, it is not intended that the present teachings be limited to such embodiments. On the contrary, the present teachings encompass various alternatives, modifications and equivalents, as will be appreciated by those of skill in the art.

Figure 1:
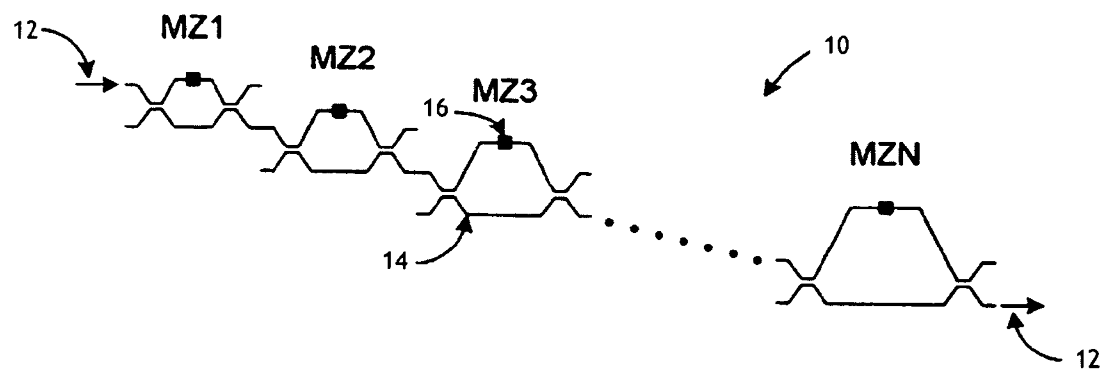
FIG. 1 is an optical circuit of a prior-art tunable optical filter.
Figure 2:
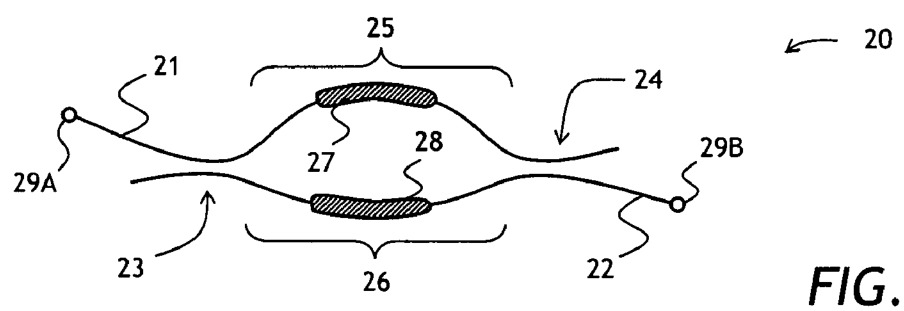
FIG. 2 is an optical diagram of an unbalanced Mach-Zehnder (MZ) interferometer.

Referring to FIG. 2, an optical diagram of an unbalanced MZ interferometer 20 used in the present invention is shown. The MZ interferometer 20 has two waveguides 21 and 22 brought into close proximity to each other at 50%, or 3-dB, evanescent coupler regions 23 and 24, thereby forming two arms 25 and 26. The arms 25 and 26 have a localized heater 27 and 28, respectively, for heating the arms 25 and 26 thereby tuning the MZ interferometer 20 by changing relative optical length of these arms. The MZ interferometer 20 is an unbalanced MZ interferometer, meaning that the optical lengths of the arms 25 and 26 differ from each other by more than a few microns, e.g. more than 10 microns. Ports 29A and 29B at the ends of the waveguides 21 and 22 are used as input and output ports of the MZ interferometer 200. The opposite ends of corresponding waveguides 21 and 22 can be used as input or output ports, as well.

Figure 3:
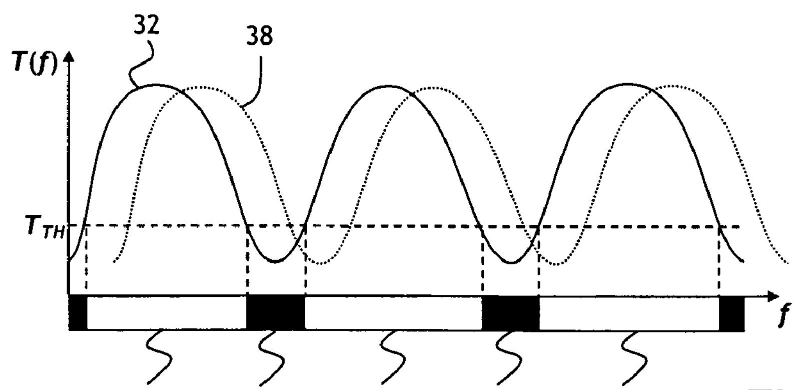
FIG. 3 is a transmission spectrum of the unbalanced MZ interferometer of FIG. 2.

Turning to FIG. 3, a typical transmission spectrum of the MZ interferometer 20 between the ports 29A and 29B thereof is shown. Solid line 32 denotes the transmission function T(f), wherein f is optical frequency. The MZ interferometer 20 has a plurality of equidistantly spaced conterminous frequency passbands 34 and frequency stopbands 36, wherein in any frequency passband 34, the transmission T is equal to or higher than a threshold value of transmission $T_{TH}$, and in any frequency stopband 36, the transmission T is lower than the threshold value $T_{TH}$. As the local heaters 27 and 28 are activated, the relative temperature of the arms 25 and 26 changes, which shifts its transmission function T(f) as is shown by a dotted line 38. Shifts in both directions are possible by properly adjusting the relative temperature of the local heaters 27 and 28.

Figure 4A:
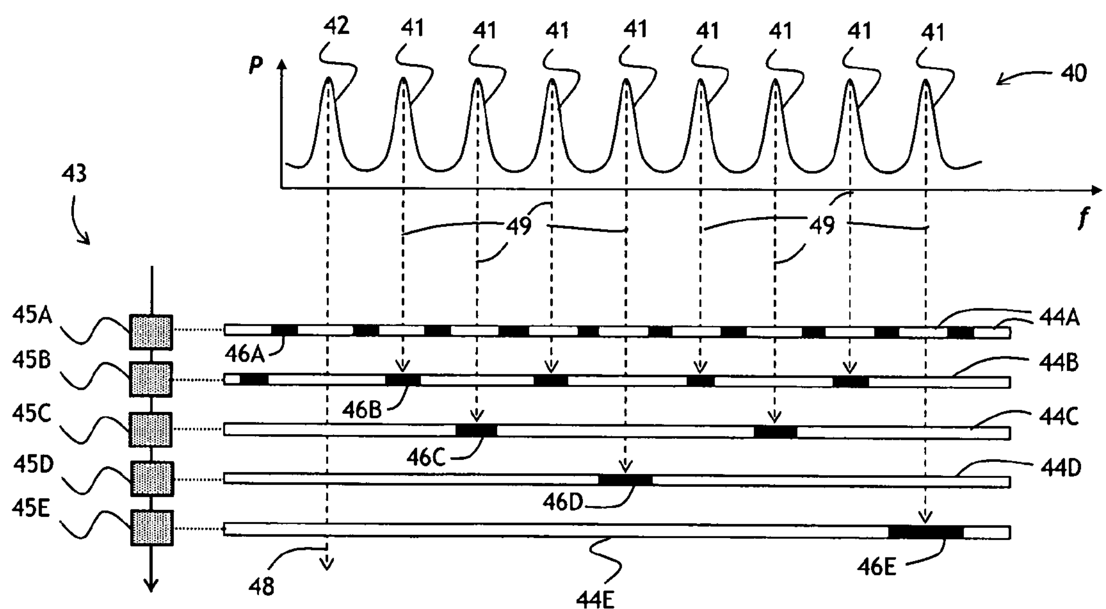
FIGS. 4A and 4B are diagrams illustrating the principle of cross-talk suppression in a tunable optical filter according to the present invention.

Referring now to FIG. 4A, a diagram illustrating a principle of crosstalk suppression in a tunable optical filter according to the present invention is shown. The invention advantageously uses a spectral shape 40 of a typical optical signal in an optical communications network to improve the crosstalk suppression. The signal 40 has equidistantly spaced optical frequency channels 41 to be suppressed and an optical frequency channel 42 to be selected. A tunable optical filter 43 of the present invention has a plurality of sequentially coupled tunable MZ interferometers 45A to 45E each having a plurality of equidistantly spaced conterminous frequency passbands 44A to 44E and frequency stopbands 46A to 46E, corresponding to the passbands 34 and stopbands 36 of FIG. 3. To achieve a high level of crosstalk suppression, the MZ interferometers 45A to 45E are tuned so as to have one passband 44A to 44E of each MZ interferometer 45A to 45E centered on the central frequency of the single frequency channel 42 being selected, while having at least one of the stopbands 46A to 46E of the MZ interferometers 45A to 45E centered on a central frequency of each remaining optical frequency channel 41 of the optical signal, so as to suppress each said remaining optical frequency channel 41 as shown with dashed arrows 49, while selecting the optical frequency channel 42 as shown with a dashed arrow 48.

Preferably, the optical frequency channels 41 and 42 are substantially centered at an International Telecommunications Union (ITU) frequency grid, e.g. a 100 GHz ITU frequency grid or a 50 GHz ITU frequency grid. Herein, the word "substantially" means that the central frequencies of the channels 41 and 42 may somewhat deviate from the ITU grid frequencies, according to typical tolerances of corresponding transmitters, as is appreciated by those skilled in the art.

The optical filter 43 tuned as shown in FIG. 4A can be used for selecting the optical frequency channel 42 for adding or dropping at a network node, or it can be used simply to measure optical power of the channel 42.

Figure 4B:
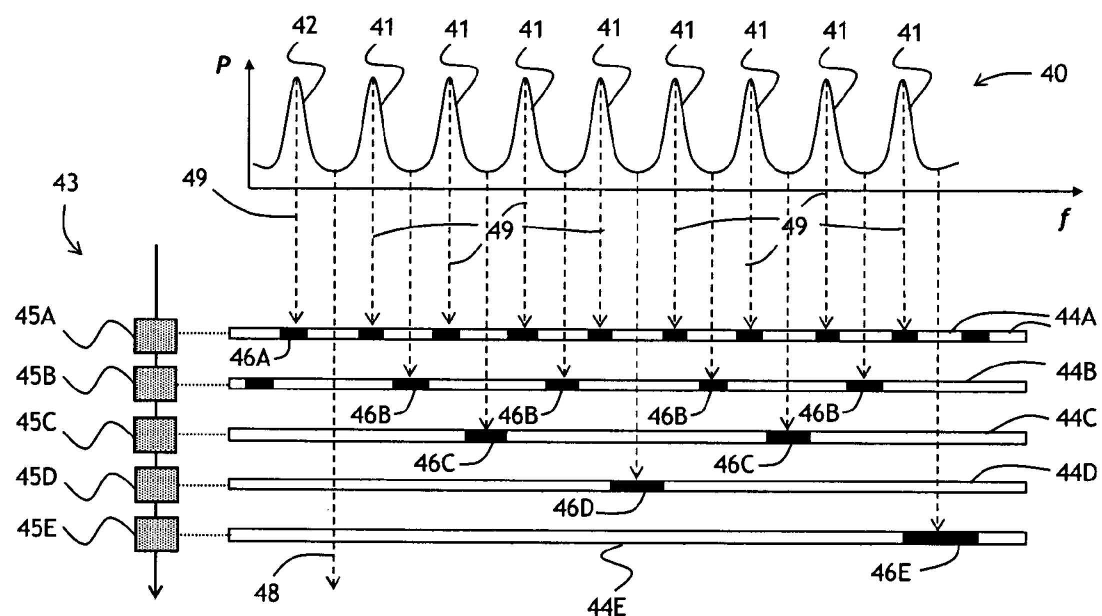

Turning now to FIG. 4B, a diagram illustrating the principle of using the tunable filter 43 for measuring optical signal-to-noise ratio (SNR) of the single optical frequency channel 42 of the plurality of the optical frequency channels 41 of the optical signal 40 is illustrated. At a first step, the optical filter 43 is tuned as shown in FIG. 4A, and optical power of the channel 42 is measured. Then, the filter 43 is tuned so as to center one passband 44A to 44E of each tunable MZ interferometer 45A to 45E on a frequency disposed substantially in the middle between the central frequency of the optical frequency channel 42 and the central frequency of one of the neighboring optical frequency channels 41. The filter 43 is tuned so as to have at least one of the stopbands 46A to 46E of the MZ interferometers 45A to 45E centered on a central frequency of each remaining optical channel 41, to suppress each said remaining optical frequency channel of the optical signal 40. Then, the optical power of a noise signal at an output end of the filter 43 is measured, and a ratio is taken of the measured value of the optical power of the single optical frequency channel 42 to the measured value of the optical power of the noise signal. This ratio is the SNR of the optical frequency channel 42.

To achieve the functionality described in FIGS. 4A and 4B, the tunable MZ interferometers 45A to 45E have their respective free spectral ranges satisfying the following condition:

$$FSR_m=(2^{m-1})*\Delta f_{ITU}, \quad (1)$$

wherein m=1 . . . 5 for the interferometers 45A to 45E, and $\Delta f_{ITU}$ is an ITU grid spacing, for example, a 50 GHz or a 100 GHz grid spacing. More MZ interferometers can be used to select one optical frequency channel out of a larger number of the optical frequency channels.

Figure 5:
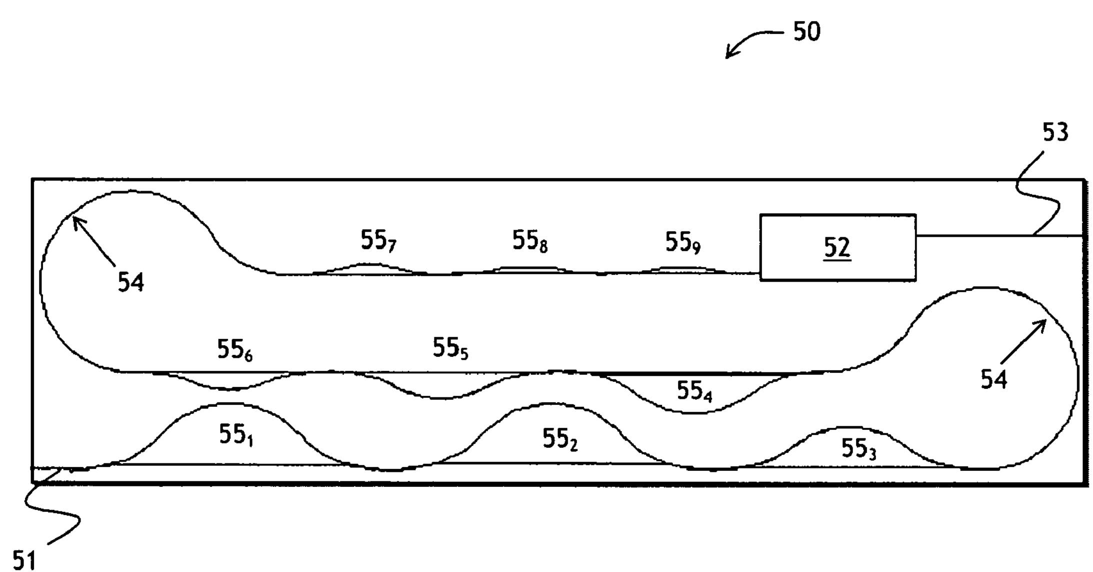
FIG. 5 is a top view of a planar lightwave circuit (PLC) embodiment of a 100 GHz tunable filter of the present invention.

With reference to FIG. 5, a plan view of a 100 GHz tunable optical filter 50 corresponding to the filter 43 of FIGS. 4A and 4B is shown. The tunable optical filter 50 utilizes planar lightwave circuit (PLC) technology, and includes PLC waveguides, i.e. a core surrounded by cladding, mounted on a substrate. The filter 50 includes an input port 51, an output port 53, and nine sequentially coupled unbalanced MZ interferometers $\mathbf{55}_1$ to $\mathbf{55}_9$. Each stage has a free spectral range (FSR) selected from a group of values satisfying Equation (1), wherein m is a positive integer. In the embodiment of FIG. 5, first and second stages $\mathbf{55}_1$ and $\mathbf{55}_2$ each have an FSR of 100 GHz, third and fourth stages $\mathbf{55}_3$ and $\mathbf{55}_4$ each have an FSR of 200 GHz, a fifth stage $\mathbf{55}_5$ has an FSR of 400 GHz, a sixth stage $\mathbf{55}_6$ has an FSR of 800 GHz, a seventh stage has an FSR of 1600 GHz, and eighth and ninth stages $\mathbf{55}_8$ and $\mathbf{55}_9$ each have an FSR of 3200 GHz. A section of the sequentially coupled stages $\mathbf{55}_1$, $\mathbf{55}_2$, and $\mathbf{55}_3$; a section of the sequentially coupled stages $\mathbf{55}_4$, $\mathbf{55}_5$, and $\mathbf{55}_6$; and a section of the sequentially coupled stages $\mathbf{55}_7$, $\mathbf{55}_8$, and $\mathbf{55}_9$ are coupled to each other with waveguide loopback sections 54 as shown.

Preferably, an optical shutter or variable optical attenuator (VOA) 52 is provided at the output end of the optical filter 50 for diverting all or a portion of the output signal away from the output port 53. The optical shutter and/or VOA 52 can be comprised of a balanced MZ stage having two output ports. The difference in arm length between the arms of the balanced MZ stage in the shutter and/or VOA 52 can also be adjusted to various positions between 0° and 180° out of phase to provide variable attenuation and/or blocking function. Alternative shutter and/or VOA arrangements are possible, as is well known in the art.

The passbands and stopbands of each stage $\mathbf{55}_1$ to $\mathbf{55}_9$ are tuned by tuning the relative length of at least one arm in each of the stages using any known technique, for example a localized heater. Preferably, the tuning range of such a heater or heaters is at least two and a half wavelengths, or 5π in optical phase units. Alternative tuning arrangements are possible, as is well known in the art.

Figure 6:
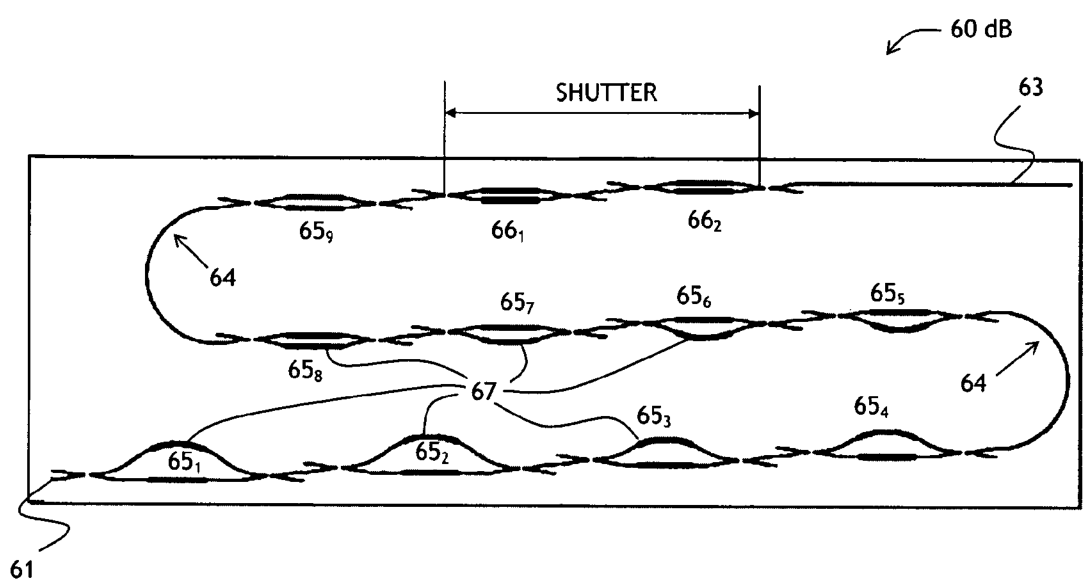
FIG. 6 is a top view of a PLC embodiment of a 50 GHz tunable filter with a shutter for hitless operation explicitly shown.

Turning now to FIG. 6, a top view of a 50 GHz tunable filter 60 corresponding to the filter 43 of FIGS. 4A and 4B is shown. The filter 60 includes an input port 61, an output port 63, and nine sequentially coupled unbalanced MZ interferometers $65_1$ to $65_9$. Each stage has an FSR, which is an integer multiple of the ITU grid spacing as explained above. In the embodiment of FIG. 6, first and second stages $65_1$ and $65_2$ each have an FSR of 50 GHz, third and fourth stages $65_3$ and $65_4$ each have an FSR of 100 GHz, fifth and sixth stages $65_5$ and $65_6$ each have an FSR of 200 GHz, a seventh stage $65_7$ has an FSR of 400 Hz, an eighth stage $55_8$ has an FSR of 800 GHz, and a ninth stage $55_9$ has an FSR of 1600 GHz. The filter 60 has a different MZ stage FSRs and placement as compared to the filter 50 of FIG. 5. The MZ stages $66_1$ and $66_2$ are balanced MZ stages used as a VOA and/or optical shutter, for suppressing the optical signal carrying all optical frequency channels by diverting all or a portion of the output signal away from the output port 63, for example during tuning of the tunable filter 60. A section of the sequentially coupled stages $65_1$, $65_2$, $65_3$, and $65_4$; a section of the sequentially coupled stages $65_5$, $65_6$, $65_7$, and $65_8$; and a section of the sequentially coupled stages $65_9$, $66_1$, and $66_2$ are coupled to each other with waveguide loopback sections 64 as shown.

The passbands and stopbands of each stage $65_1$ to $65_9$ are tuned by tuning the relative length of each arm in each of the stages using localized heaters 67.

Figure 7:
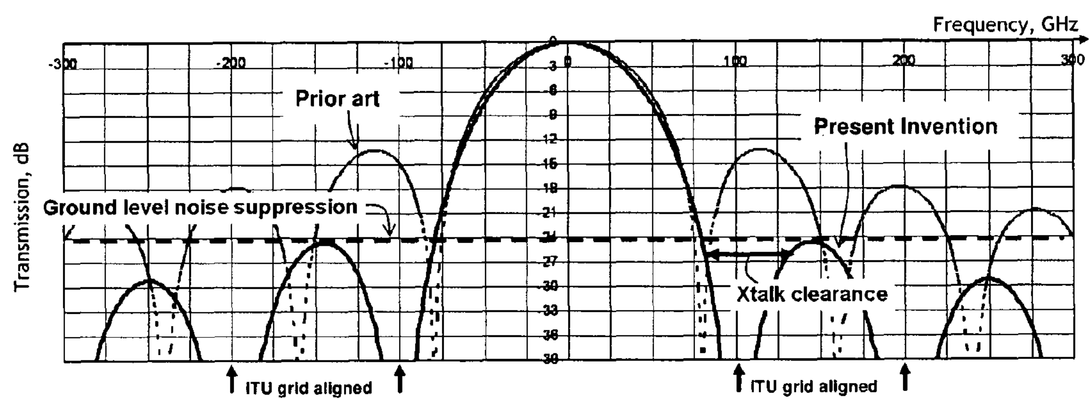
FIG. 7 shows transmission spectra of a tunable filter of the present invention and of a prior-art tunable filter.

With further reference to FIG. 7, a transmission spectrum of a tunable filter of the present invention is shown in comparison with a transmission spectrum of a prior-art tunable filter. The tunable filter of the present invention has the following sequentially coupled stages: a 6400 GHz stage; a 3200 GHz stage; a 1600 GHz stage; a 800 GHz stage; two 400 GHz stages; and two 200 GHz stages. The prior-art tunable filter is modeled after a filter taught in U.S. Pat. No. 6,208,780. The prior-art tunable filter does not have the stages aligned to the ITU grid, which results in at least 25 dB worse crosstalk at +−100 GHz, and at least 22 dB worse crosstalk at +−200 GHz. Thus, a filter of the present invention has a crosstalk improved by at least two orders of magnitude as compared to the crosstalk performance of the prior-art filter of U.S. Pat. No. 6,208,780.

Figure 8A:
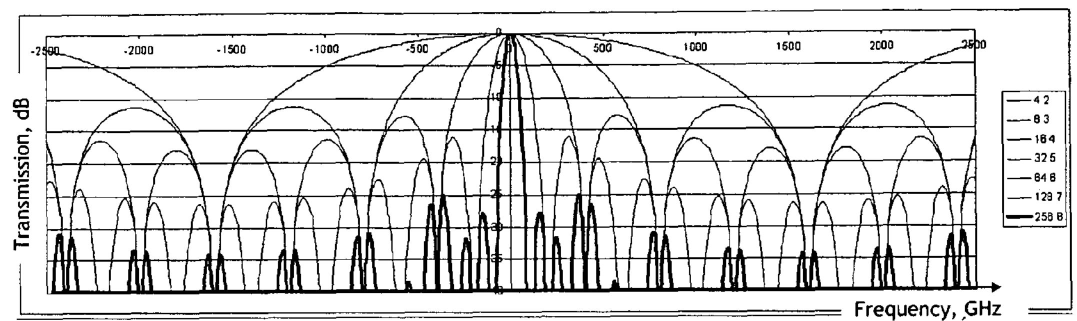
FIGS. 8A and 8B show transmission spectra of a tunable filter for a broadcasting application, FIG. 8B being a zoom-in view of FIG. 8A.
Figure 8B:
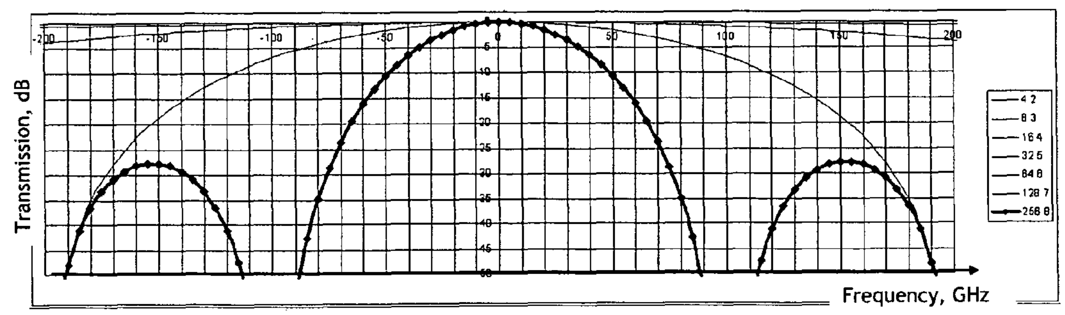

With reference to FIG. 8A, a transmission spectrum of a tunable filter of for a broadcasting application is shown, the tunable filter having sequentially coupled one 3200 GHz stage; one 1600 GHz stage; one 800 GHz stage; two 400 GHz stages; and one 200 GHz stage. Herein, the terms "stage" or "MZ stage are used interchangeably with the term "MZ interferometer". In FIG. 8A, the transmission minima, or the stopbands, are located on both sides of the central transmission maximum, at an ITU grid having a spacing of 100 GHz, that is, the spacing equal to one half of the FSR of the 200 GHz stage. Referring back to FIG. 4A for a comparison, the MZ stage 45B has an FSR twice the channel spacing of the signal 40. Note that the stage 45A is required for SNR measurement and is not required for selecting a single channel for broadcasting application. Referring to FIG. 8B, the Figure shows a zoomed-in view of FIG. 8A, the black dots corresponding to the resulting transmission spectrum of the sequentially coupled MZ stages. One can see two stopbands at −100 GHz and +100 GHz.

Figure 9A:
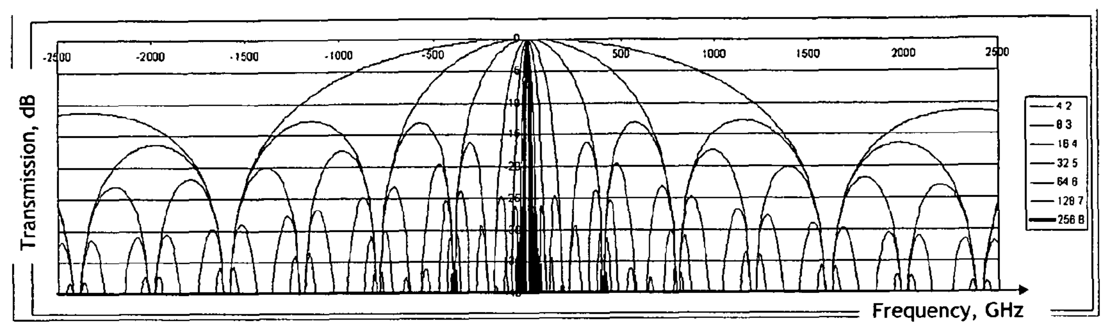
FIGS. 9A and 9B show transmission spectra of a tunable filter for a optical channel monitoring application, FIG. 9B being a zoom-in view of FIG. 9A.
Figure 9B:
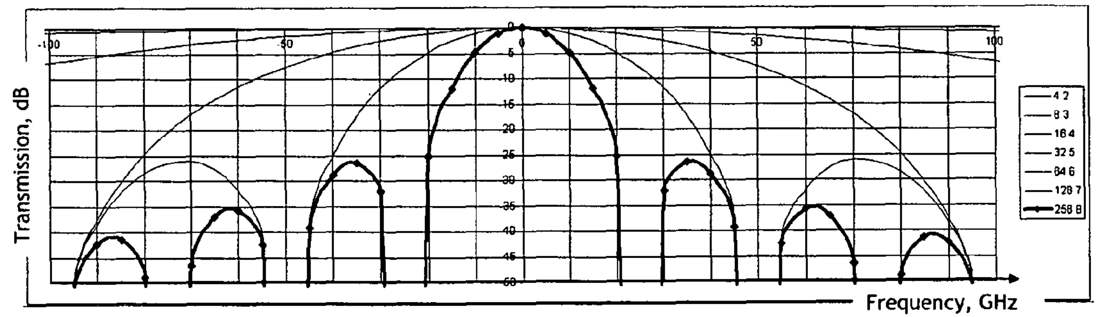

Referring now to FIG. 9A, a transmission spectrum of a tunable filter for an optical channel monitoring application is shown, the tunable filter having sequentially coupled one 6400 stage; one 3200 GHz stage; one 1600 GHz stage; one 800 GHz stage; two 400 GHz stages; two 200 GHz stages; two 100 GHz stages; and two 50 GHz stages. In FIG. 9A, transmission minima are located on both sides of the central transmission maximum, at an ITU grid having a spacing of 25 GHz, that is, the spacing equal to one half of the FSR of the 50 GHz stage. FIG. 9B shows a zoomed-in view, the black dots corresponding to the resulting transmission spectrum of the sequentially coupled MZ stages. One can see two stopbands at −25 GHz and +25 GHz. Two 50 GHz stages are required to improve spectral selectivity of the tunable filter; furthermore, a 50 GHz stage is required for SNR measurement, so as to block optical frequency channels at 50 GHz spacing while measuring a noise signal at one location between optical frequency channels, as has been explained in a paragraph discussing FIG. 4B.

Figure 10A:
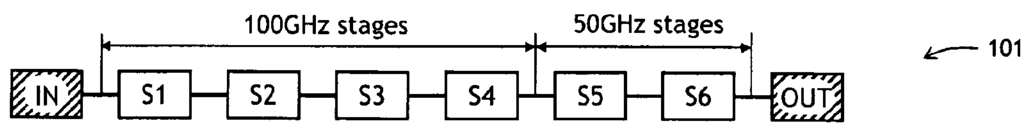
FIGS. 10A to 10D are optical circuits of a non-switchable and a switchable tunable filter in accordance with the present invention.
Figure 10B:
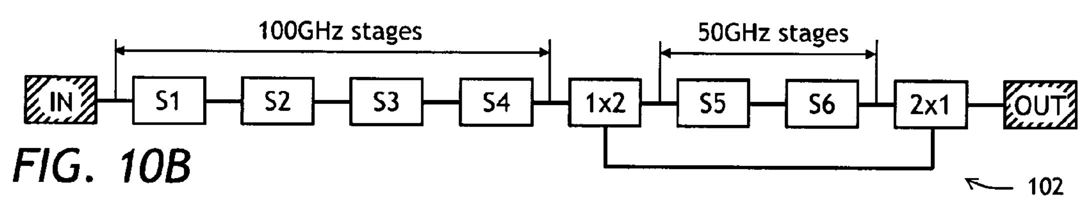
Figure 10C:
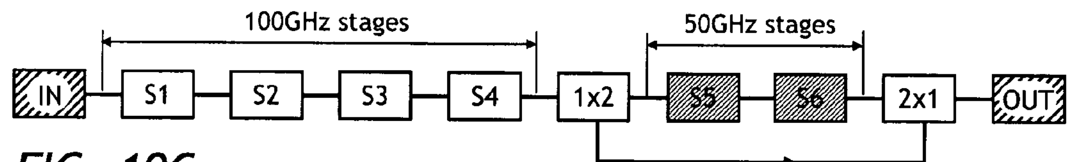
Figure 10D:
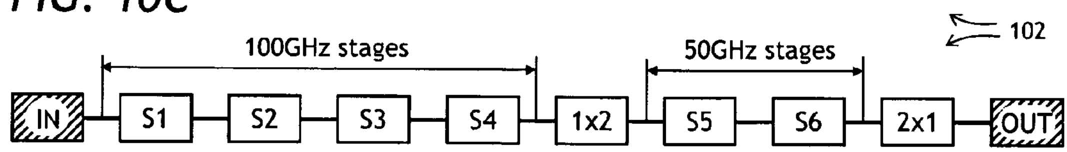

Turning to FIGS. 10A to 10D, optical circuits of a non-switchable and a switchable tunable filter in accordance with the present invention are shown. In FIG. 10A, a non-switchable tunable filter 101 is shown having serially connected six stages S1 to S6 between "IN" and "OUT" ports thereof, the stages S1 to S4 being the stages with FSRs of multiples of 100 GHz, and the additional stages S5 and S6 having FSR of 50 GHz, for extra spectral selectivity. In FIG. 10B, a switchable tunable filter 102 is shown, further having by a pair of 1×2 and 2×1 optical switches. In the filter 102, the 50 GHz stages S5 and S6 can be switched in and out of an optical path of the optical signal between "IN" and "OUT" ports of the filter 102. For example, in FIG. 10C, the optical signal bypasses the 50 GHz stages S5 and S6, while in FIG. 10D, the optical path of the signal contains the stages S5 and S6. Note that the number of additional stages and the stage FSR and, or spectral resolution are just examples, and the same concept could be used with more switchable paths of a different spectral resolution if needed.

Figure 11A:
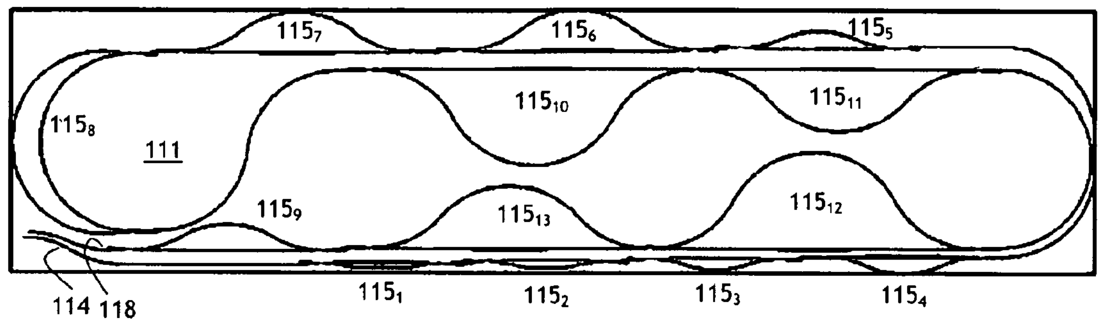
FIG. 11A is a plan view of a compact 50 GHz tunable filter.

Referring now to FIG. 11A, a plan view of a compact 50 GHz PLC tunable filter 111 is shown. The filter 111 corresponds to the filter 101 of FIG. 10A with the input and output ports 114 and 118 at the same end of the chip. The filter 111 has 9 single MZ stages $115_1$ to $115_9$, and 4 MZ stages $115_{10}$ to $115_{13}$ forming a two-stage tunable wideband interleaver described in more detail below. The interleaver is disposed between the stages $115_8$ and $115_9$.

Figure 11B:
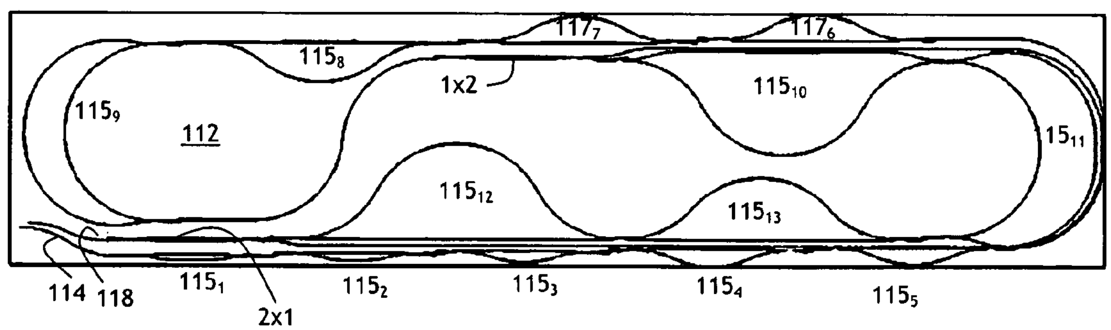
FIG. 11B is a plan view of a compact 50 GHz/100 GHz switchable tunable filter.

Turning to FIG. 11B, a plan view of a compact 50 GHz/100 GHz PLC switchable tunable filter 112 is shown. The filter 112 corresponds to the switchable filter 102 of FIG. 10A with the input and output ports 114 and 118 at the same end of the chip. The filter 112 has 9 single MZ stages $115_1$ to $115_5$, $117_6$, $117_7$, $115_8$, and $115_9$, 4 MZ stages $115_{10}$ to $115_{13}$ forming a two-stage tunable wideband interleaver, a 1×2 optical switch, and 2×1 optical switch. The interleaver is disposed between the 1×2 switch and the 2×1 switch. The actual number of the MZ stages may differ between the filters of FIGS. 10A to 10D and 11A, 11B.

Figure 12:
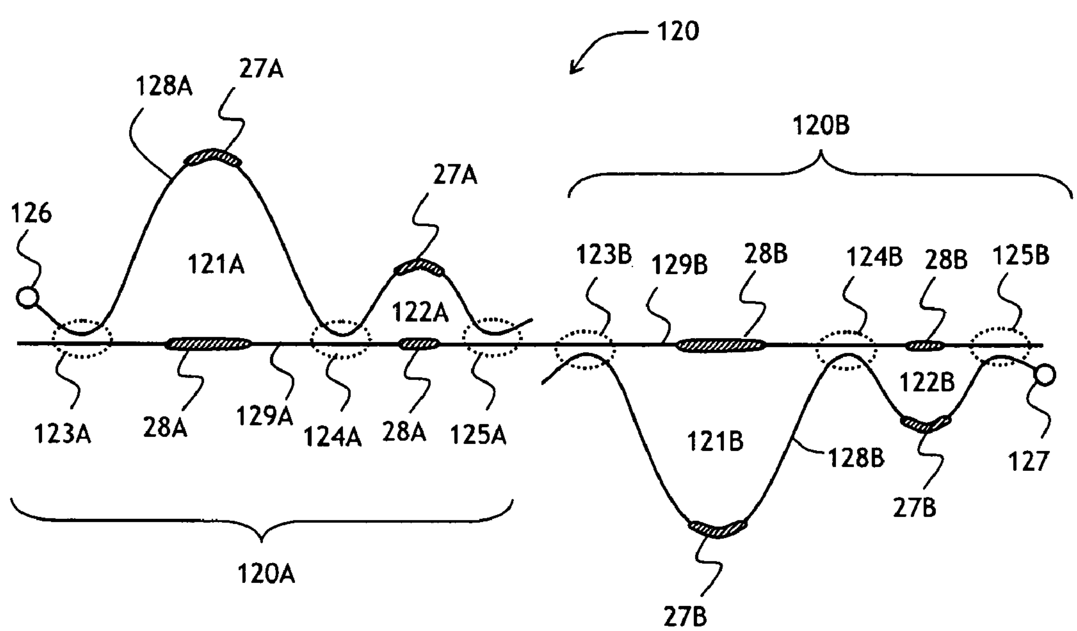
FIG. 12 is an optical circuit of a two-stage wideband interleaver.

One embodiment of a tunable optical filter of the present invention includes a tunable wideband interleaver for improving a passband shape and reducing chromatic dispersion of the filter. Turning to FIG. 12, an optical circuit of such an interleaver is shown. A two-stage tunable wideband interleaver 120 has two serially coupled interleaver stages 120A and 120B between an input port 126 and an output port 127. Each interleaver stage 120A and 120B is a waveguide embodiment of a so called lattice filter. The interleaver stage 120A has waveguides 128A and 129A and couplers 123A, 124A, and 125A between the waveguides 128A and 129A, so as to form first and second tunable MZ stages 121A and 122A between the couplers 123A and 124A and the couplers 124A and 125A, respectively. The interleaver stage 120B has waveguides 128B and 129B and couplers 123B, 124B, and 125B between the waveguides 128B and 129B, so as to form third and fourth tunable MZ stages 121B and 122B between the couplers 123B and 124B and the couplers 124B and 125B, respectively. Accordingly, an optical signal launched into the input port 126 will undergo two successive stages of separation and interference, whereby the output signal at the output port 127 will be comprised of only every other optical frequency channel, e.g. the odd or even channels, from the input optical signal, whereby, for example, 50 GHz signals will be at 100 GHz frequency spacing. Local heaters 27A, 28A, 27B, and 28B are used to synchronously tune central frequencies of the MZ stages 121A, 122A, 121B, and 122B. The MZ stages 121A and 121B have a same FSR, which is selected from a group of values satisfying Equation (1) above, wherein m is a positive integer. The MZ stages 122A and 122B have an FSR that is twice than the FSR of the stage 121A or 121B. The coupling ratios of the couplers 123A to 125A, 123B to 125B are selected to optimize the spectral shape of passbands and stopbands of the interleaver, as is known to skilled in the art.

Figure 13:
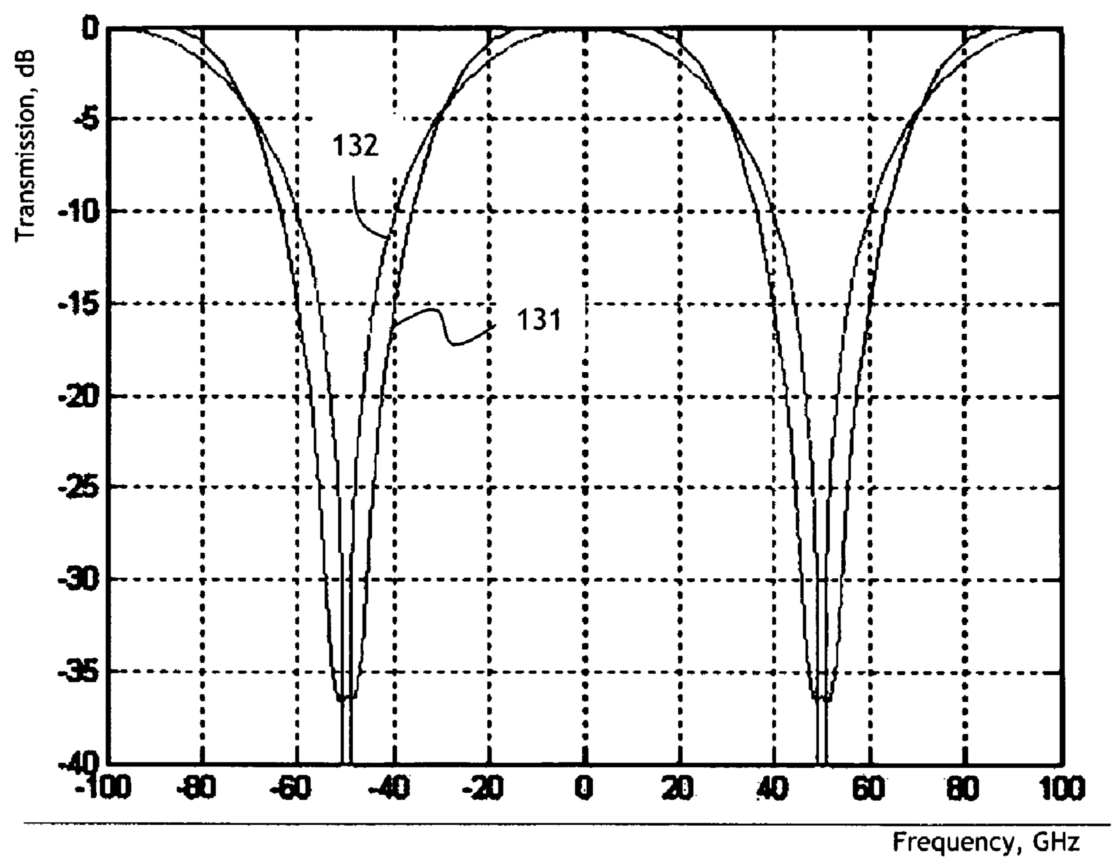
FIG. 13 shows transmission spectra of one wideband interleaver stage of the interleaver of FIG. 12 and one MZ interferometer.

The spectral performance of the interleaver 120 will now be illustrated. Referring to FIG. 13, a calculated transmission spectrum 131 of one interleaver stage 120A of the interleaver 120 is shown in comparison with a calculated transmission spectrum 132 of a MZ interferometer having the same FSR as the stage 120A. By comparing the spectra 131 and 132 to each other, one can see that a 3 dB passband bandwidth and a 30 dB stopband bandwidth of the spectrum 131 is wider than that of the spectrum 132. Thus, the stage 120A provides a wider passband with a steeper roll over, thereby further improving isolation between adjacent optical frequency channels.

Figure 14A:
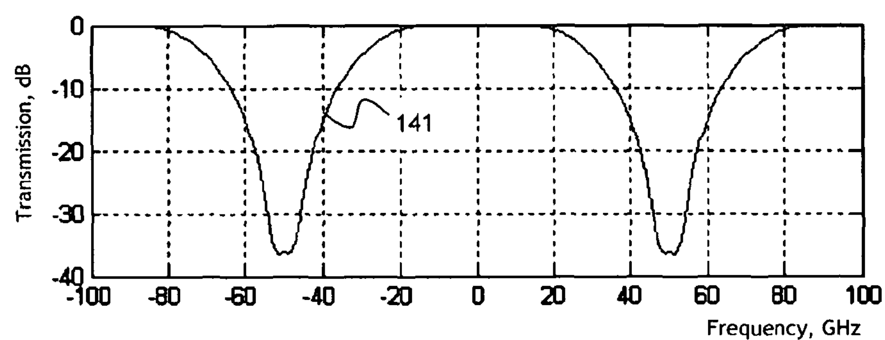
FIGS. 14A and 14B are a transmission spectrum and a spectral plot of in-band chromatic dispersion, respectively, of one wideband interleaver stage of the two-stage wideband interleaver of FIG. 12.
Figure 14B:
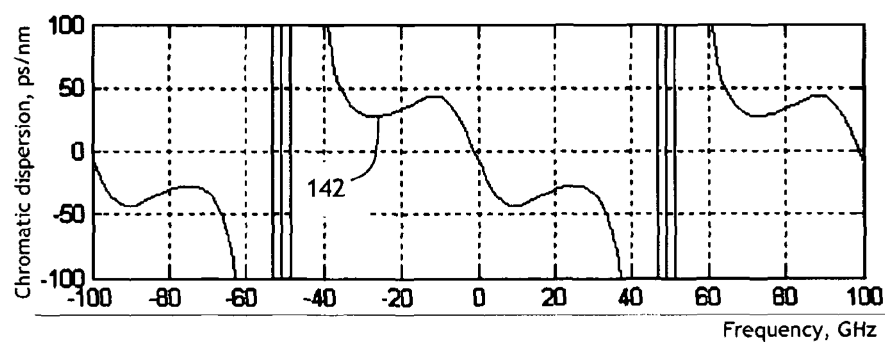

Referring to FIGS. 14A and 14B, a transmission spectrum 141 and a spectral plot of in-band chromatic dispersion 142, respectively, of the wideband interleaver stage 120A or 120B of the two-stage wideband interleaver 120 are shown. The spectrum 141 is the spectrum 131 of FIG. 13 drawn to a different scale. The chromatic dispersion across the passband varies between −50 ps/nm and +50 ps/nm which can be detrimental in an application of the stage 120A for filtering an optical communications signal.

Figure 15A:
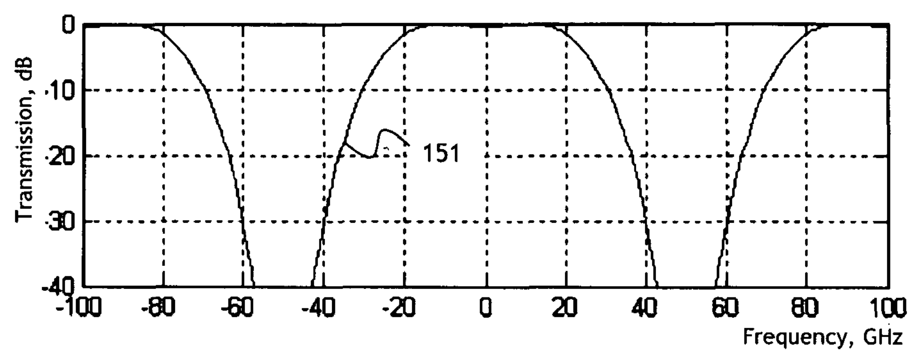
FIGS. 15A and 15B are a transmission spectrum and a spectral plot of in-band chromatic dispersion, respectively, of the entire two-stage wideband interleaver of FIG. 12.
Figure 15B:
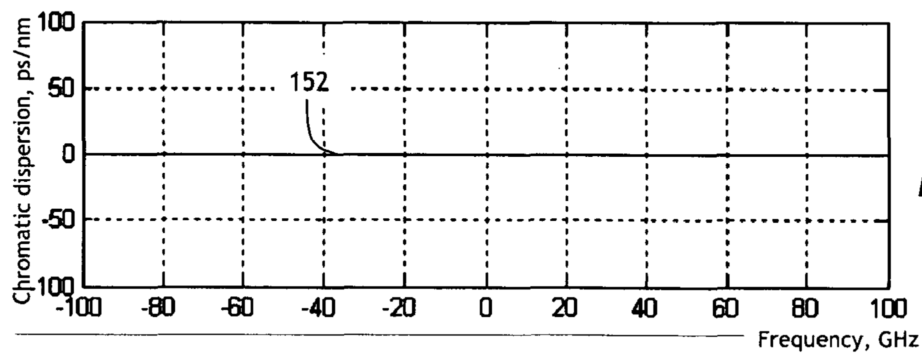

The chromatic dispersion of a lattice type interleaver can be brought to nearly zero by providing the two-stage interleaver 120, in which the corresponding delays of the first stage 120A are inverted in the second stage 120B and, as a result, the chromatic dispersion of the stage 120B compensates for the chromatic dispersion of the stage 120A. Turning now to FIGS. 15A and 15B, a calculated transmission spectrum 151 and a calculated spectral plot of in-band chromatic dispersion 152, respectively, of the two-stage wideband interleaver 120 are shown. The spectral shape 151 doubles the isolation, in dB units, of the spectral shape 141. The chromatic dispersion 152 is zero, that is, it is fully compensated in this calculation. The coupling ratios of the couplers and the other parameters required for dispersion compensation in cascaded lattice-type MZ interferometers are known in the art, for example, they are described in U.S. Pat. No. 6,721,477 entitled "Dispersion-free optical filters", issued to Bouevitch et al. of JDS Uniphase, and incorporated herein by reference.

Figure 16:
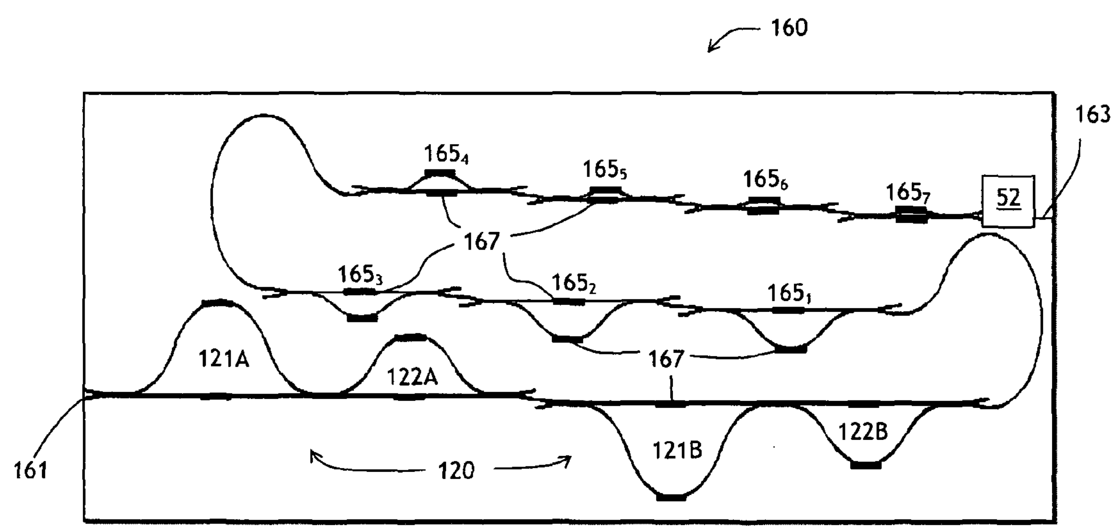
FIG. 16 is a top view of a 50 GHz tunable filter with an interleaver and a shutter.
Figure 17:
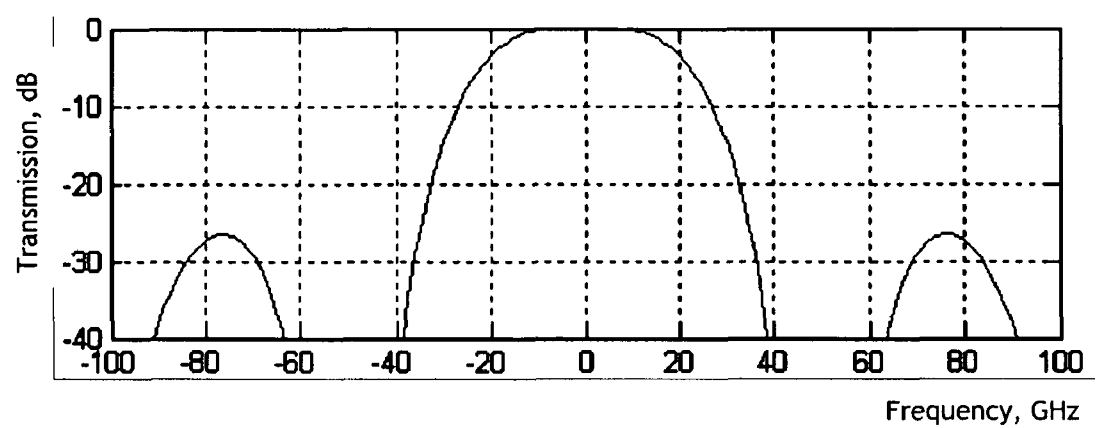
FIG. 17 is a passband spectrum of the tunable filter of FIG. 16.

Referring now to FIG. 16, a top view of a 50 GHz tunable filter 160 with the two-stage tunable interleaver 120 of FIG. 12 and the shutter 52 of FIG. 5 is shown. The filter 160 has an input port 161 for launching an optical signal including a plurality of optical frequency channels into the tunable interleaver 120. Seven single tunable MZ interferometers $\mathbf{165}_1$ to $\mathbf{165}_7$ follow, each with at least one means for tuning 167, e.g. heaters. Preferably, the tuning range of the heaters is at least two and a half wavelengths, or $5\pi$ in optical phase units. In the illustrated embodiment, the first and second stages $\mathbf{165}_1$ and $\mathbf{165}_2$ each have an FSR of 200 GHz, the third stage $\mathbf{165}_3$ has an FSR of 400 GHz, the fourth stage $\mathbf{165}_4$ has an FSR of 800 GHz, the fifth stage $\mathbf{165}_5$ has an FSR of 1600 GHz, the sixth stage $\mathbf{165}_6$ has an FSR of 3200 GHz, while seventh stages $\mathbf{165}_6$ has the FSR of 6400 GHz. The shutter and, or VOA 52 is positioned before an output port 163. The spectral response of the optical filter 160, seen in FIG. 17, illustrates a wide passband, 30 GHz to 40 GHz, with minimal side lobes, which are spaced apart from the main passband.

Figure 18:
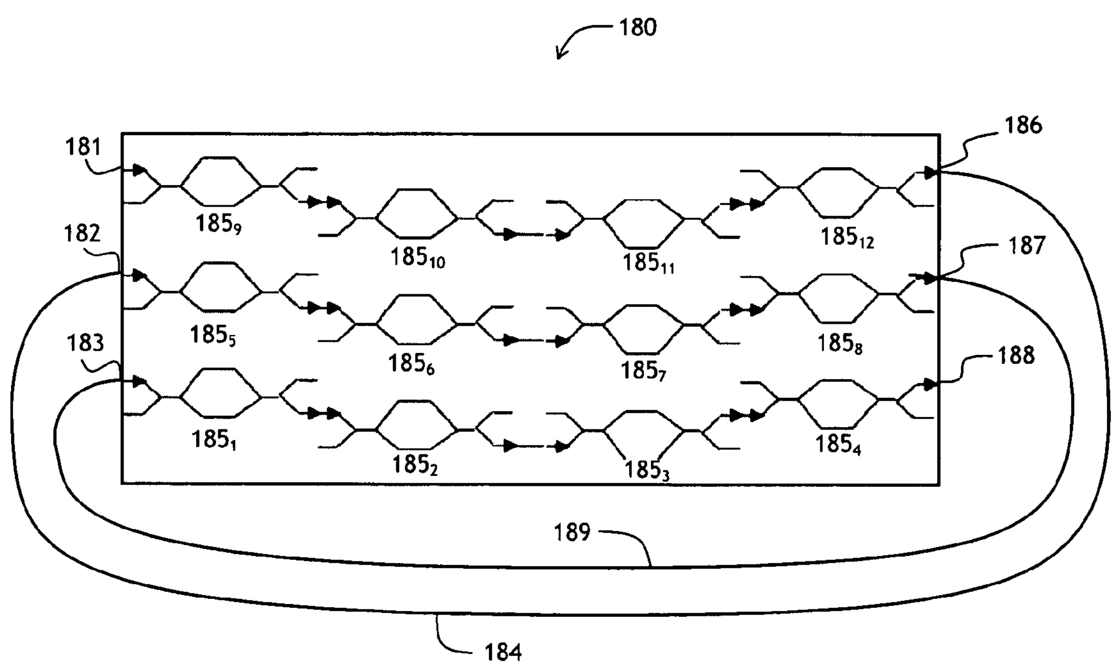
FIG. 18 is a top view of a cascaded tunable MZ optical filter in accordance with the present invention, wherein the filter is integrated on a single PLC chip in a plurality of parallel rows with optical fibers optically coupling the different rows.

With reference to FIG. 18, any of the optical filters 43, 50, 60, 101, 102, 111, 112, or 160, in accordance with the present invention, can be integrated into a single PLC chip 180 by having corresponding tunable MZ interferometers, e.g. $\mathbf{185}_1$ to $\mathbf{185}_{12}$ in FIG. 18, arranged in a plurality of, e.g. three, different sections of sequentially coupled tunable MZ interferometers. Each said section on the chip 180 of FIG. 18 has an input port 181, 182, or 183, and an output port 186, 187, and 188. Accordingly, after passing through the first plurality of interferometers, e.g. the interferometers $\mathbf{185}_1$ to $\mathbf{185}_4$, an optical signal injected into the input port 181 is routed out of the chip 160 at the output port 186 via an optical fiber 184 to the second input port 182. The second input port 182 enables the remaining optical signal to pass through the next plurality of stages, e.g. the stages $\mathbf{185}_5$ to $\mathbf{185}_8$, after which the optical signal is again routed out of the chip 180 at the output port 187 via an optical fiber 189 to a third input port 183. The third input port 183 enables the remaining optical signal to pass through the next plurality of stages, e.g. the stages $\mathbf{185}_9$ to $\mathbf{185}_{12}$, after which the optical signal is routed to the output port 188. Advantageously, using the loopback fibers 184 and 189 allows for a considerable reduction of size of the PLC chip 180.

Figure 19:
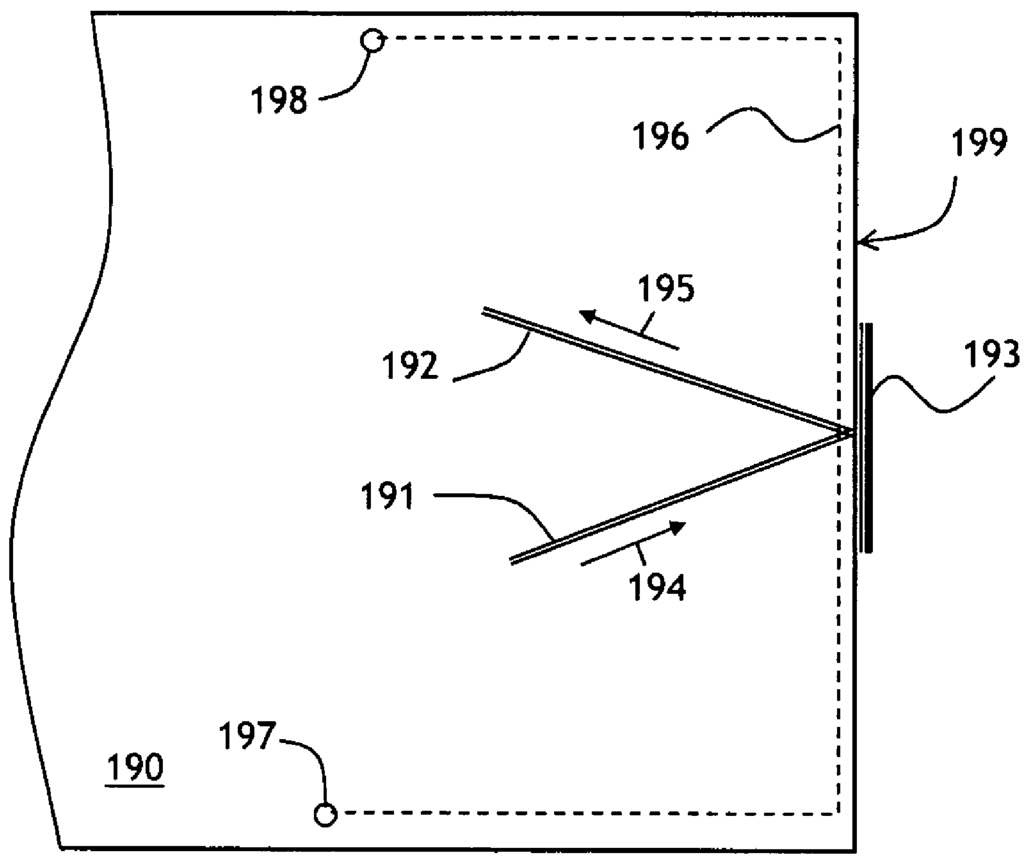
FIG. 19 is a plan view of a PLC chip having a V-shaped end waveguide structure and a mirror.

According to the present invention, a PLC chip size can also be reduced by using a mirror at an edge of the PLC chip. Turning now to FIG. 19, a plan view of a PLC chip 190 is presented. The chip 190 has end waveguides 191 and 192 forming a V-shape at an end of the chip 190, and a mirror 193 disposed substantially at a tip of said V-shape, for optically coupling the end waveguides 191 and 192 to each other. An optical signal propagating in the waveguide 191 as shown by an arrow 194, is reflected by the mirror 193 and is coupled into the waveguide 192, which guides the signal away from the tip of the V-shape, as shown by an arrow 195. The angle between the waveguides 191 and 192 is preferably 12 degrees or more, to avoid backreflection into the same waveguide, e.g. the waveguide 191. The PLC size reduction is achieved by avoiding waveguide loops for redirecting the optical signal, such as, for example, the waveguide loopback sections 54 of FIG. 5, or the loopback sections 64 of FIG. 6.

An optical coupling efficiency of coupling the reflected optical signal into the waveguide 192 depends on the accuracy with which an edge 199 of the chip 190 is polished so that the waveguides 191 and 192 cross exactly at an edge of the chip 190. A polishing accuracy of only a few microns is usually required. According to the present invention, the following method can be used to achieve the required polishing precision. An electrically conducting metal trace 196 is photolithographically defined and deposited at an exact crossing point of the waveguides 191 and 192, or with an optional offset to accommodate the width of the metal trace. During polishing of the edge 199, an electrical resistance is monitored between terminals 197 and 198 of the metal trace 196. When the resistance increases sharply due to polishing off the trace 196, the polishing is stopped. Then, the mirror 193 is attached to the edge 199.

Figure 20A:
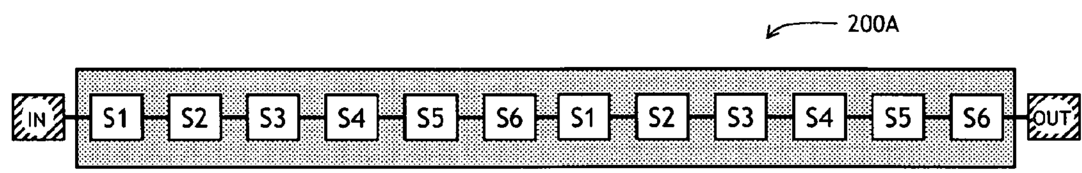
FIGS. 20A to 20C are optical circuits of various embodiments of tunable filters with double stages.
Figure 20B:
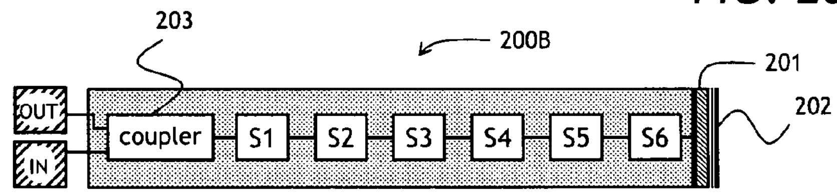
Figure 20C:
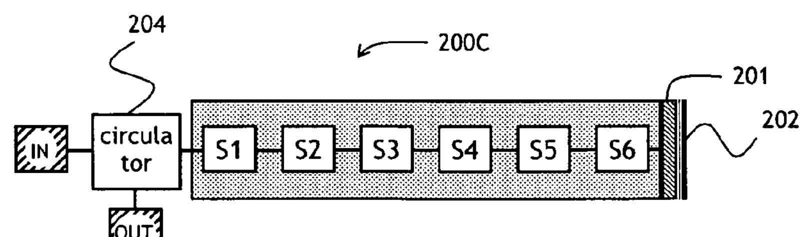

Referring now to FIGS. 20A to 20C, optical circuits of various embodiments of tunable filters are shown. The embodiments of FIGS. 20A to 20C make use of double MZ stages, or double passing single MZ stages, which generally improves spectral resolution and crosstalk suppression. In FIG. 20A, a PLC chip 200A has 12 tunable MZ stages connected in series between "IN" port and "OUT" port, having six distinct MZ stages S1 to S6, the FSRs of which are in the binary relation to each other and are multiples of the ITU grid spacing, as per Equation (1) above. In FIG. 20B, a PLC chip 200B has the same optical functionality as the chip 200A; however, the chip 200B is considerably shorter due to double passing the stages S1 to S6.

In the double-pass arrangement of FIG. 20B, the sequentially coupled tunable MZ interferometers S1 to S6 form an optical path between the "IN" and the "OUT" ports. A mirror 202 and an optional quarter-wave plate 201 are optically coupled to the stage S6. The mirror 202 retroreflects the incoming light back towards the "IN" port, and a directional coupler 203 separates the incoming and the outgoing optical signals. In the double-pass arrangement of FIG. 20C, the same mirror 202 and the waveplate 201 are used, but instead of the coupler 203, an external optical circulator 204 is used to separate the incoming and the outgoing optical signals. In both cases, the waveplate 201 is preferably used to reduce polarization dependent loss (PDL) by rotating the polarization state of the reflected optical signal by 90 degrees upon double passing the waveplate 201.

Figure 21:
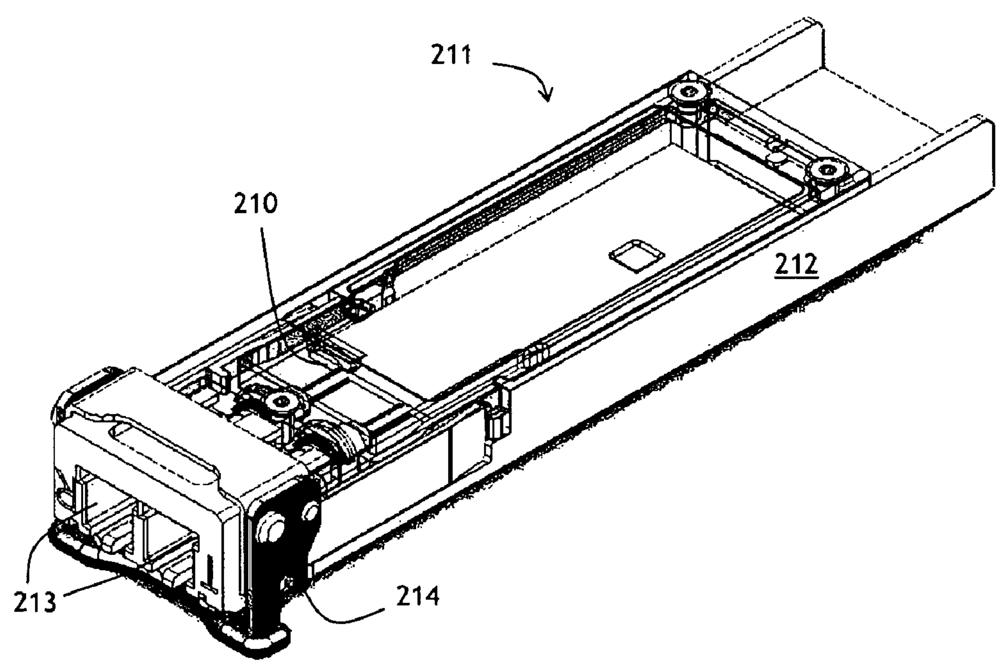
FIG. 21 is an isometric view of a tunable filter packaged into a XFP transceiver package.
Figure 22:
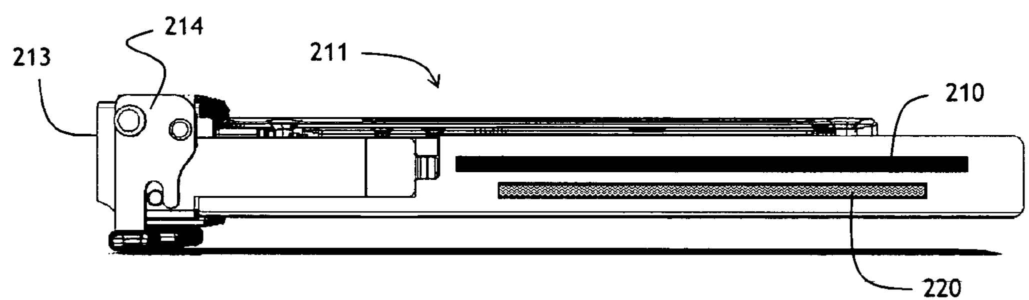
FIG. 22 is a side cross-sectional view of the package of FIG. 21 showing a compensation heater.

The embodiments of the tunable optical filter of FIGS. 18, 19, 20B, and 20C allow the footprint of the PLC chip to be considerably reduced, so that the PLC chip can be packaged in a standard compact-size telecommunications package together with control electronics. Turning to FIG. 21, an isometric view of a tunable filter 210 packaged into an XFP small form factor hot-pluggable transceiver package 211 is shown. The XFP transceiver package has a length of 78 mm, a width of 18.4 mm, and a height of 8.5 mm and includes a housing 212, optical couplers 213 at one end thereof for receiving the ends of input and output optical fibers, and an electrical connector, not shown, at the other end thereof. Typically, a latch 214 is provided for locking the housing 212 in position. In FIG. 22, a side view of the package 211 is presented. A compensation heater 220 is disposed underneath the PLC chip 210. The role of the compensation heater 220 is to heat the entire PLC chip 210.

Figure 23A:
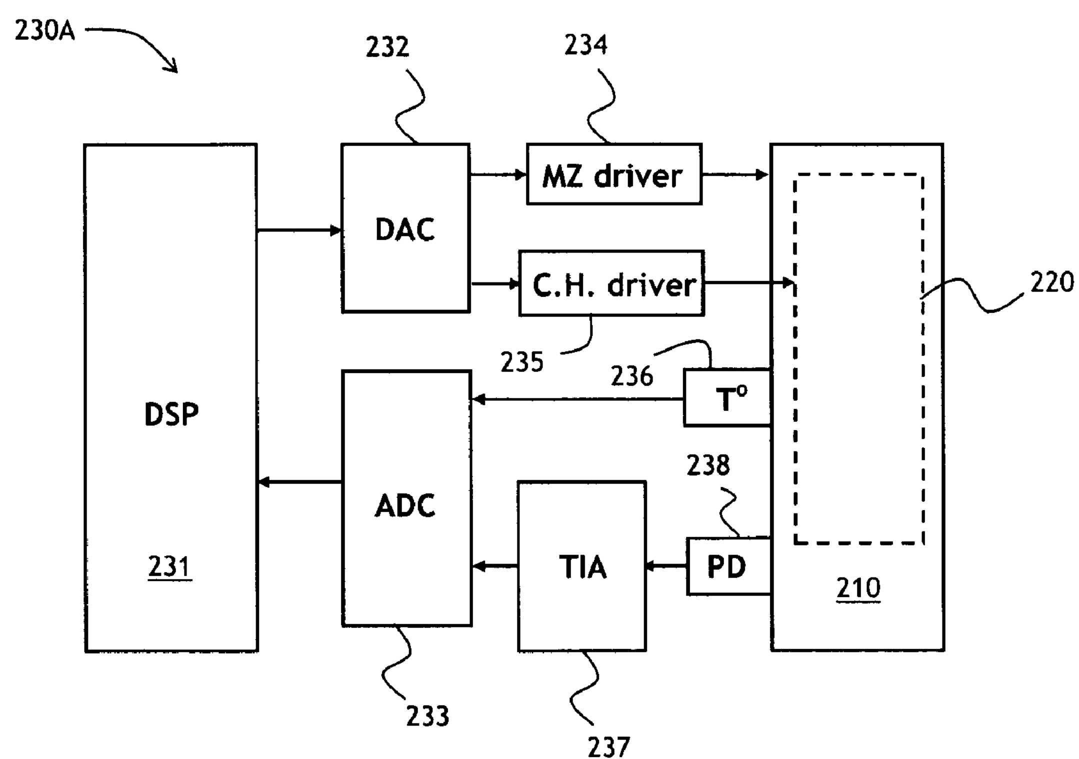
FIGS. 23A and 23B are electrical circuit block diagrams for thermal control of the tunable filter of FIGS. 21 and 22.

Referring to FIG. 23A, an electrical block diagram of a control circuit 230A for thermal control of the tunable filter PLC chip 210 is shown. The circuit 230A has a digital signal processing (DSP) module 231, a digital-to-analog converter (DAC) 232, an analog-to-digital converter (ADC) 233, a MZ interferometer heaters driver module 234, a compensation heater driver 235, a thermal sensor 236, a transimpedance amplifier (TIA) 237, and a photodiode 238. In operation, the DSP module 231 controls the amount of heat applied to the TF chip 210 by providing a digital control signal to the DAC 232, which provides analog control signals to the MZ driver 234 and to the compensation heater driver 235. The driver 234 generates electrical currents for driving local heaters of the chip 210, e.g. the heaters 27, 27A, B, 28, 28A, B, 67 and 167. The driver 235 generates an electrical current for driving the compensation heater 220. According to a preferred embodiment of the invention, the DSP module 231 controls the amount of heat so that the total amount of heat generated by the local heaters of the chip 210 and by the compensation heater 210 is constant, so that the temperature of the PLC chip 210 does not change significantly upon tuning of individual MZ stages. A constant temperature of the PLC chip 210 facilitates precise alignment of the stopbands of the MS interferometer stages of the PLC chip 210 to all but one of the ITU frequencies, to suppress all but one of the optical frequency channels.

The thermal sensor 236 generates an electrical signal representative of the temperature of the chip 210. This signal is digitized by the ADC 233 and, in digital form, is provided to the DSP module 231 for correcting the amount of heat generated by one or more heaters. According to one control method, the DSP module is operable to correct the amount of heat generated by the local heaters, not shown in FIG. 23A, so as to reduce dependence of the optical phases of the MZ interferometers on the overall PLC chip temperature. According to another control method of the present invention, the DSP module is operable to control the amount of the heat generated, so as to stabilize the temperature of the chip 210. Both methods of the invention are described in more detail below.

Figure 23B:
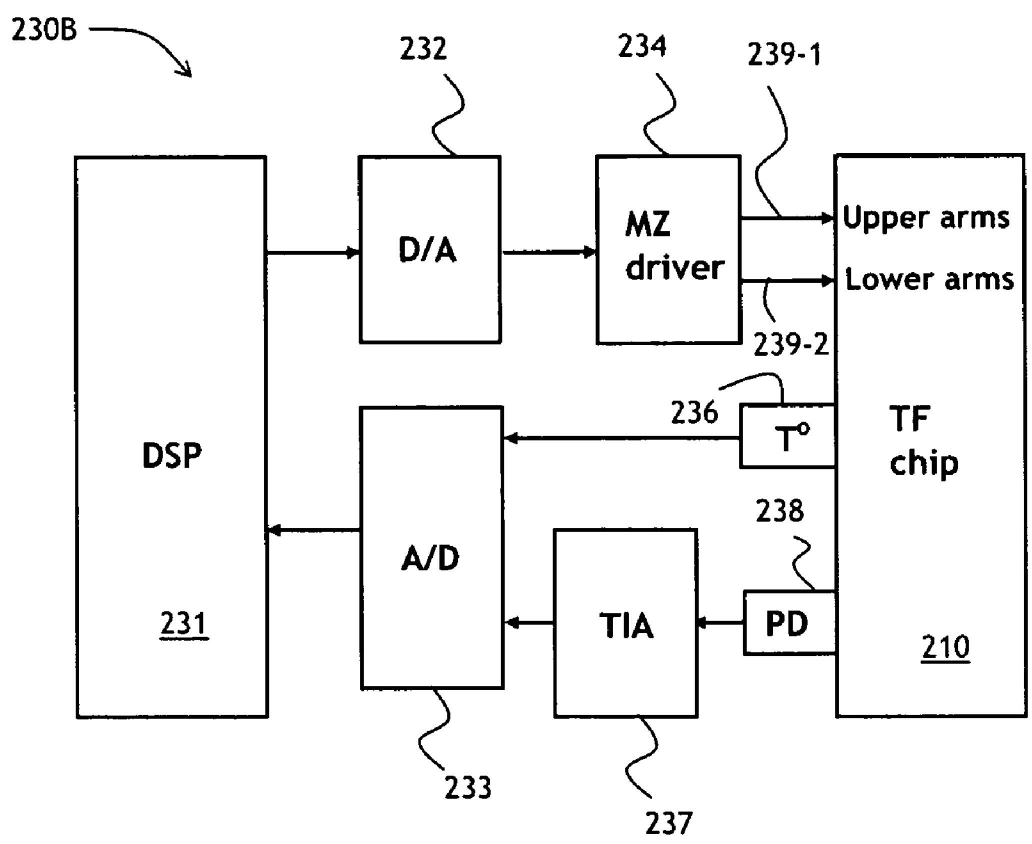

Referring now to FIG. 23B, an electrical block diagram of an alternative control circuit 230B for thermal control of the tunable filter PLC chip 210 is shown. In the control circuit 230B, the MZ driver 234 is used to drive the local heaters of the upper and the lower arms of the MZ interferometers of the chip 210, as is symbolically shown with arrows 239-1 and 239-2. The local heaters are driven so that the total amount of heat applied to any MZ interferometer is constant. For example, referring back to FIG. 2, the MZ interferometer 20 has two local heaters: the upper heater 27 and the lower heater 28. By reducing the amount of heat applied to the upper heater 27 while increasing the amount of heat applied to the lower heater 28, the interferometer 20 can be tuned, as is shown in FIG. 3. The amount of heat applied to the MZ interferometer 20, when controlled by the control circuit 230B, is constant. When the amount of heat applied to every MZ stage of the PLC 210 is constant, the total amount of heat applied is constant, which reduces the chip temperature variation upon tuning of individual MZ stages.

Figure 24:
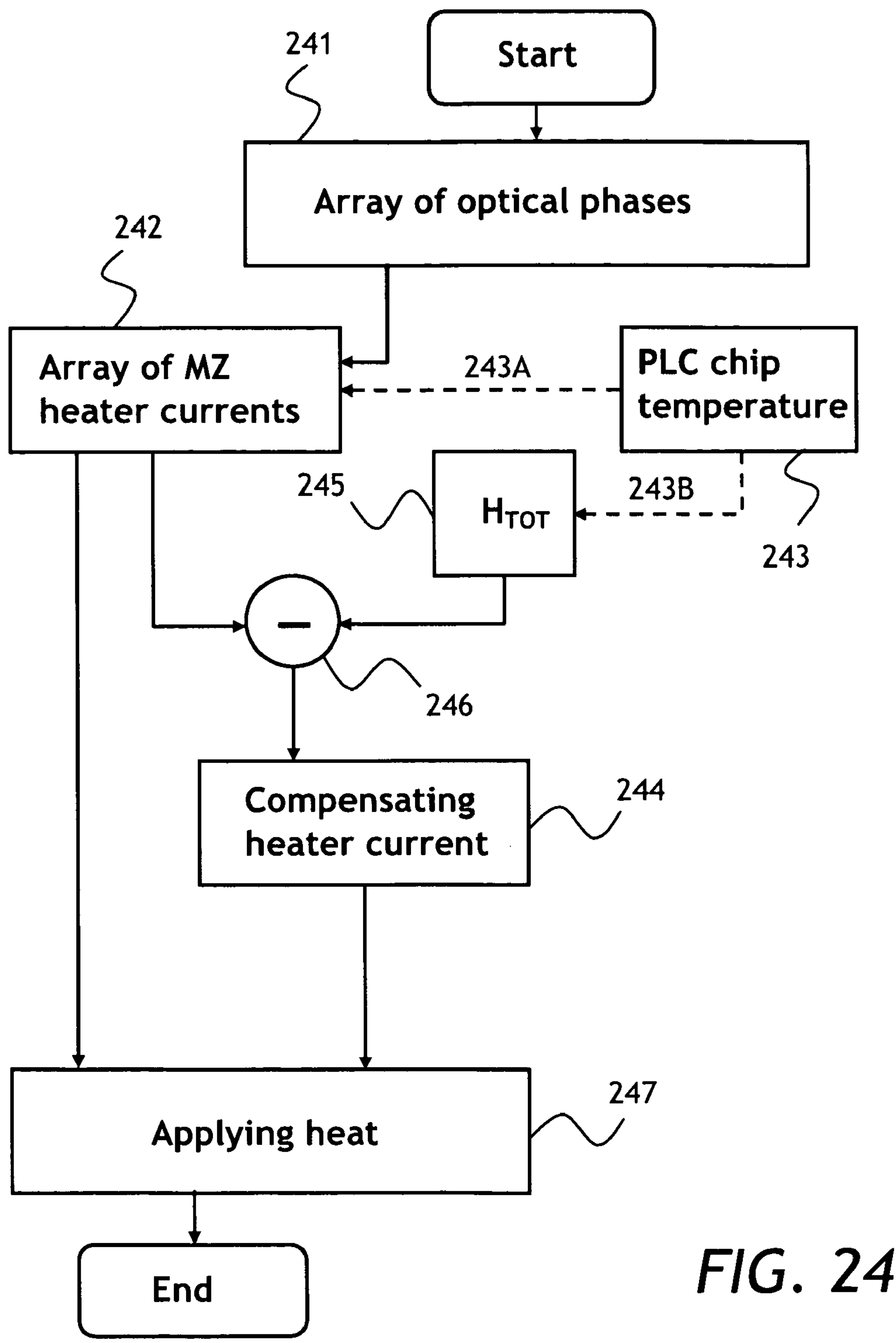
FIG. 24 is a block diagram of thermal control method of a PLC tunable filter of FIGS. 21 and 22 using electronics of FIGS. 23A and 23B.

Turning to FIG. 24, a flow chart illustrating a preferred method of thermal control of the PLC chip 210 is presented. The procedure is initiated upon a command and, or in regular time intervals. The array of optical phases of the individual MZ stages for tuning the PLC filter 210 is calculated at a step 241. Then, at a step 242, the optical phases are translated into values of electrical currents to be applied to the individual local heaters of the chip 210. The overall PLC chip temperature is measured at a step 243. According to one control method, the PLC chip temperature is taken into account when calculating local heater currents at the step 242, as is symbolically shown with dashed arrow 243A. At a step 244, a value of electrical current for the compensating heater 220 is calculated. This value is calculated by retrieving a value of a total heat generated $H_{TOT}$ at a step 245, and by subtracting the amount of heat to be generated by the local heaters from $H_{TOT}$ at a step 246. At a step 247, the heat is applied to the chip 210 by applying electrical currents calculated at steps 242 and 244, to the corresponding heaters.

According to an alternative method of thermal control of the present invention, the PLC chip temperature measured at the step 243 is used to periodically update the value $H_{TOT}$, as is symbolically shown with a dashed arrow 243B, so as to keep the overall chip temperature constant. Once the value $H_{TOT}$ is updated, the total heat generated by all the heaters is controlled to be constant during a time interval called herein a "control time interval". When one control time interval is over, the value $H_{TOT}$ is updated again, and another control time interval begins.

The above described features, aspects, and embodiments of the present invention can be combined by those skilled in the art. It is these many combinations of features and aspects of the present invention that should lead one to realize that the concept is broader than the embodiments and method steps disclosed. For this reason one is cautioned not to limit the invention to the disclosed embodiments, but rather encouraged to determine the scope of the invention only with reference to the following claims.

What is claimed is:

1. A tunable optical filter for selecting any single optical frequency channel from a plurality of equidistantly spaced optical frequency channels of an optical signal, each said optical frequency channel having a central frequency, the filter comprising:

a plurality of sequentially coupled tunable Mach-Zehnder (MZ) interferometers each having a plurality of equidistantly spaced conterminous frequency passbands and frequency stopbands, wherein the MZ interferometers are tunable so as to have one passband of each MZ interferometer centered on the central frequency of the single frequency channel being selected, and to have at least one of the stopbands of the MZ interferometers centered on the central frequency of each remaining optical frequency channel of the optical signal, so as to suppress each said remaining optical frequency channel of the optical signal, wherein the central frequencies of the optical frequency channels are substantially at an ITU frequency grid having a frequency spacing of $\Delta f_{ITU}$, and wherein each MZ interferometer has a free spectral range (FSR), wherein, for a sub-group of M of the plurality of the MZ interferometers, the FSR of an $m^{th}$ MZ interferometer of the sub-group is $FSR_m=(2^{m-1})*\Delta f_{ITU}$, wherein m=1 . . . M, and M is an integer ≧2, wherein the tunable optical filter further comprises a switchable stage serially coupled to the plurality of the tunable MZ interferometers, the switchable stage having:

a 1×2 optical switch having an input port for inputting the optical signal, and first and second output ports;

a 2×1 optical switch having first and second input ports, and an output port for outputting the optical signal; and at least one additional tunable MZ interferometer having an input port and an output port;

wherein the first output port of the 1×2 optical switch is coupled to the first input port of the 2×1 optical switch;

wherein the second output port of the 1×2 optical switch is coupled to the input port of the at least one additional MZ interferometer, and wherein the output port of the at least one additional tunable MZ interferometer is coupled to the second input port of the 2×1 optical switch;

whereby the at least one additional tunable MZ interferometer is switchable in and out of an optical path of the optical signal.

2. A tunable optical filter of claim 1, wherein $\Delta f_{ITU}$=50 GHz.

3. A tunable optical filter of claim 1, further comprising at least one additional MZ interferometer sequentially coupled to the MZ interferometers, having an FSR equal to the FSR of one of the sub-group of M MZ interferometers.

4. A tunable optical filter of claim 1, further comprising a first tunable interleaver stage serially coupled to the plurality of the tunable MZ interferometers, the first tunable interleaver stage having:

first and second waveguides having first, second, and third waveguide couplers therebetween along the length thereof, so as to form first and second tunable MZ stages between the first and the second, and the second and the third couplers, respectively, each said tunable MZ stage having an FSR;

wherein the FSR of the first tunable MZ stage is FSR(I)=$(2^{k-1})*\Delta f_{ITU}$, wherein k is a positive integer;

wherein the FSR of the second tunable MZ stage is FSR(II)=2*FSR(I).

5. A tunable optical filter of claim 4, further comprising a second tunable interleaver stage serially coupled to the plurality of the tunable MZ interferometers and, or to the first tunable interleaver stage, the second tunable interleaver stage having:

third and fourth waveguides having fourth, fifth, and sixth waveguide couplers therebetween along the length thereof, so as to form third and fourth tunable MZ stages between the fourth and the fifth, and the fifth and the sixth couplers, respectively, each said tunable MZ stage having an FSR;

wherein the FSR of the third tunable MZ stage is FSR(III)=FSR(I);

wherein the FSR of the fourth tunable MZ stage is FSR(IV)=FSR(II);

wherein the first and the second tunable interleaver stages each have a passband and an in-band dispersion across the corresponding passband, wherein the passbands of the first and the second interleavers are tunable to overlap each other, so as to have the in-band dispersion of the first tunable interleaver stage compensate for the in-band dispersion of the second tunable interleaver stage.

6. A tunable optical filter of claim 1, wherein the tunable MZ interferometers are comprised of planar waveguides, wherein the tunable optical filter further comprises a planar substrate for supporting the planar waveguides of the tunable MZ interferometers, the planar substrate and the planar waveguides forming a planar lightwave circuit (PLC) chip having a top surface, a bottom surface, and first and second sides.

7. A tunable optical filter of claim 6, further comprising a plurality of local heaters disposed on the top surface of the PLC chip, for thermally tuning said tunable MZ interferometers.

8. A tunable optical filter for selecting any single optical frequency channel from a plurality of equidistantly spaced optical frequency channels of an optical signal, each said optical frequency channel having a central frequency, the filter comprising:

a plurality of sequentially coupled tunable Mach-Zehnder (MZ) interferometers each having a plurality of equidistantly spaced conterminous frequency passbands and frequency stopbands, wherein the MZ interferometers are tunable so as to have one passband of each MZ interferometer centered on the central frequency of the single frequency channel being selected, and to have at least one of the stopbands of the MZ interferometers centered on the central frequency of each remaining optical frequency channel of the optical signal, so as to suppress each said remaining optical frequency channel of the optical signal, wherein the tunable MZ interferometers are comprised of planar waveguides, wherein the tunable optical filter further comprises a planar substrate for supporting the planar waveguides of the tunable MZ interferometers, the planar substrate and the planar waveguides forming a planar lightwave circuit (PLC) chip having a top surface, a bottom surface, and first and second sides, the tunable optical filter further comprising:

a plurality of local heaters disposed on the top surface of the PLC chip, for thermally tuning said tunable MZ interferometers;

a compensation heater for heating said PLC chip; and a control circuitry suitably programmed to thermally tune said tunable MZ interferometers by controlling an amount of heat generated by the plurality of local heaters and by the compensation heater, so as to keep the total amount of heat generated by all said heaters equal to a constant value $H_{tot}$, within any control time interval of a succession of control time intervals.

9. A tunable optical filter of claim 8, further comprising:

a temperature sensor for sensing the PLC chip temperature; and a control circuitry suitably programmed to thermally tune said tunable MZ interferometers by controlling an amount of heat generated by the plurality of local heaters and by the compensation heater in dependence upon the PLC chip temperature sensed by the temperature sensor.

10. A tunable optical filter of claim 8, further comprising a temperature sensor for sensing the PLC chip temperature;

wherein the control circuitry is suitably programmed to update the value $H_{tot}$ in dependence upon the PLC chip temperature sensed by the temperature sensor, during a time between said control time intervals, so as to lessen a variation of the PLC chip temperature.

11. A tunable optical filter of claim 8, further comprising a hot-pluggable XFP transceiver package, wherein the PLC chip, the compensation heater, and the control circuitry are disposed within said hot-pluggable XFP transceiver package.

* * * * *